US012614519B2

(12) United States Patent
Kim et al.

(10) Patent No.: US 12,614,519 B2
(45) Date of Patent: Apr. 28, 2026

(54) PIXEL, DISPLAY DEVICE INCLUDING THE SAME AND ELECTRONIC DEVICE INCLUDING DISPLAY DEVICE

(71) Applicant: Samsung Display Co., Ltd., Yongin-si (KR)

(72) Inventors: Dong Woo Kim, Yongin-si (KR); Kyung Bae Kim, Yongin-si (KR); Yeon Kyung Kim, Yongin-si (KR); Kyeong Min Park, Yongin-si (KR); Yong Hee Lee, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 19/096,679

(22) Filed: Mar. 31, 2025

(65) Prior Publication Data

US 2025/0378786 A1 Dec. 11, 2025

(30) Foreign Application Priority Data

Jun. 11, 2024 (KR) ........................ 10-2024-0075742

(51) Int. Cl.
*G09G 3/3233* (2016.01)
*G09G 3/32* (2016.01)

(52) U.S. Cl.
CPC ............. *G09G 3/3233* (2013.01); *G09G 3/32* (2013.01); *G09G 2300/0819* (2013.01); *G09G 2300/0852* (2013.01); *G09G 2300/0861* (2013.01); *G09G 2310/08* (2013.01)

(58) Field of Classification Search
CPC ....... G09G 2300/0819; G09G 2310/08; G09G 3/30–3291; G09G 2300/0842–0871
See application file for complete search history.

(56) References Cited

U.S. PATENT DOCUMENTS

| | | | |
|---|---|---|---|
| 7,379,039 B2 | 5/2008 | Yumoto | |
| 9,626,904 B2 | 4/2017 | Kimura et al. | |
| 10,475,381 B2 | 11/2019 | Yoon et al. | |
| 10,763,451 B2 | 9/2020 | Lius et al. | |

(Continued)

FOREIGN PATENT DOCUMENTS

| | | |
|---|---|---|
| EP | 4485442 A1 | 1/2025 |
| KR | 102297000 B1 | 9/2021 |

(Continued)

*Primary Examiner* — Amy Onyekaba

(74) *Attorney, Agent, or Firm* — CANTOR COLBURN LLP

(57) ABSTRACT

A pixel includes a first transistor including a first electrode connected to a first node, a second electrode connected to a second node, and a gate electrode connected to a third node, a second transistor connected between a data line and the third node, and including a gate electrode connected to a first scan line, a third transistor connected between a first power line to which first driving power is supplied, and the first node, and including a gate electrode connected to an emission control line, a first capacitor connected between the first and third nodes, a second capacitor connected between the third node and a reference power line to which reference power is supplied, a third capacitor connected between the second and third nodes, and a light-emitting element connected between the second node and a second power line to which second driving power is supplied.

17 Claims, 11 Drawing Sheets

(56) References Cited

U.S. PATENT DOCUMENTS

| | | | | |
|---|---|---|---|---|
| 11,328,666 | B2 * | 5/2022 | Cho | G09G 3/3233 |
| 11,328,673 | B2 | 5/2022 | Kim et al. | |
| 11,387,304 | B2 | 7/2022 | Sato | |
| 11,430,390 | B2 | 8/2022 | Jeong et al. | |
| 11,735,098 | B2 * | 8/2023 | Takasugi | G09G 3/3233 345/204 |
| 12,039,933 | B2 * | 7/2024 | Kim | G09G 3/3291 |
| 12,437,705 | B2 | 10/2025 | Lee et al. | |
| 12,475,845 | B2 | 11/2025 | Lee et al. | |
| 12,512,070 | B2 | 12/2025 | Lee et al. | |
| 2009/0309516 | A1 * | 12/2009 | Kim | G09G 3/3233 315/307 |
| 2011/0063266 | A1 * | 3/2011 | Chung | G09G 3/3233 345/82 |
| 2011/0199357 | A1 | 8/2011 | Chung et al. | |
| 2012/0038605 | A1 | 2/2012 | Han | |
| 2015/0138253 | A1 | 5/2015 | Kimura et al. | |
| 2015/0187273 | A1 * | 7/2015 | Chang | G09G 3/3233 345/77 |
| 2018/0062105 | A1 | 3/2018 | Lius et al. | |
| 2018/0197462 | A1 | 7/2018 | Nagayama et al. | |
| 2019/0019458 | A1 | 1/2019 | Teraguchi | |
| 2020/0320930 | A1 | 10/2020 | Toyotaka et al. | |
| 2021/0242292 | A1 | 8/2021 | Tsuboi | |
| 2022/0173189 | A1 * | 6/2022 | Kim | G09G 3/325 |
| 2022/0366849 | A1 | 11/2022 | Lee et al. | |
| 2022/0375408 | A1 * | 11/2022 | Dong | G09G 3/3241 |
| 2023/0018546 | A1 | 1/2023 | Kim et al. | |
| 2024/0355279 | A1 | 10/2024 | Lee et al. | |
| 2025/0048859 | A1 | 2/2025 | Niu et al. | |
| 2025/0393396 | A1 | 12/2025 | Lee et al. | |

FOREIGN PATENT DOCUMENTS

| | | | |
|---|---|---|---|
| KR | 20210116827 | A | 9/2021 |
| KR | 20220020473 | A | 2/2022 |
| KR | 20220155541 | A | 11/2022 |
| KR | 102555155 | B1 | 7/2023 |
| KR | 102628633 | B1 | 1/2024 |
| KR | 20240172347 | A | 12/2024 |

* cited by examiner

PIXEL, DISPLAY DEVICE INCLUDING THE SAME AND ELECTRONIC DEVICE INCLUDING DISPLAY DEVICE

CROSS-REFERENCE TO RELATED APPLICATION

The application claims priority to Korean patent application number 10-2024-0075742, filed on Jun. 11, 2024, and all the benefits accruing therefrom under 35 U.S.C. § 119, the content of which in its entirety is herein incorporated by reference.

BACKGROUND

1. Field

Various embodiments of the disclosure relate to a pixel, a display device including the pixel, and an electronic device including the display device.

2. Description of Related Art

With the development of information technology, the importance of display devices as a medium connecting users and information has been emphasized. Owing to the importance of display devices, the use of various kinds of display devices, such as a liquid crystal display device and an organic light-emitting display device, has increased.

Recently, there has been development in head mounted display devices ("HMDs"). The HMDs are display devices, which allow a user to wear in the form of glasses or a helmet, and are used to create virtual reality ("VR") or augmented reality ("AR") experiences where the focus is formed at a close distance in front of the eyes of the user. The HMDs employ high-resolution panels, requiring pixels that may be applied to high-resolution panels.

SUMMARY

Various embodiments of the disclosure are directed to a pixel applicable to a high-resolution panel, and a display device including the pixel.

An embodiment of the disclosure provides a pixel including: a first transistor including a first electrode connected to a first node, a second electrode connected to a second node, and a gate electrode connected to a third node; a second transistor connected between a data line and the third node, and including a gate electrode electrically connected to a first scan line; a third transistor connected between a first power line to which first driving power is supplied, and the first node, and including a gate electrode electrically connected to an emission control line; a first capacitor connected between the first node and the third node; a second capacitor connected between the third node and a reference power line to which reference power is supplied; a third capacitor connected between the second node and the third node; and a light-emitting element connected between the second node and a second power line to which second driving power is supplied.

In an embodiment, the pixel may further include a fourth transistor including a first electrode connected to the second node, a second electrode electrically connected to a third power line to which initialization power is supplied, and a gate electrode electrically connected to a second scan line.

In an embodiment, a voltage level of the reference power may be lower than a voltage level of the first driving power, and be higher than a voltage level of the initialization power.

In an embodiment, a voltage level of the reference power may be equal to a voltage level of the first driving power. The reference power line may be the first power line.

In an embodiment, when a voltage of the initialization power is supplied to the second node, the light-emitting element may be turned off.

In an embodiment, each of the first to the fourth transistors may include a metal-oxide-semiconductor field-effect transistor ("MOSFET") including a body electrode.

In an embodiment, a voltage of the first driving power may be supplied to the body electrode of each of the first to the fourth transistors.

In an embodiment, a horizontal period may include a first period, a second period, and a third period. During the first period, the second transistor, the third transistor, and the fourth transistor may be set to a turn-on state. During the second period, the second transistor and the fourth transistor may be set to the turn-on state, and the third transistor may be set to a turn-off state. During the third period, the third transistor and the fourth transistor may be set to the turn-on state, and the second transistor may be set to the turn-off state.

In an embodiment, during the first to the third periods, a voltage of a data signal may be supplied to the data line.

In an embodiment, each of the first to the third capacitors may include a metal-oxide-metal ("MOM") capacitor or a metal-insulator-metal ("MIM") capacitor.

In an embodiment, each of the first and the second capacitors may include a MOM capacitor or a MIM capacitor. The third capacitor may include a parasitic capacitor.

An embodiment of the disclosure provides a display device, including pixels connected to write scan lines, initialization scan lines, data lines, and emission control lines. Among the pixels, a pixel disposed on an i-th pixel row (where i is a natural number greater than 0) and a j-th pixel column (where j is a natural number greater than 0) includes: a first transistor including a first electrode connected to a first node, a second electrode connected to a second node, and a gate electrode connected to a third node; a second transistor connected between a j-th data line among the data lines and the third node, and configured to be turned on when a first scan signal is supplied to a first scan line among the write scan lines; a third transistor connected between a first power line to which a voltage of first driving power is supplied and the first node, and configured to be turned off when an emission control signal is supplied to a k-th emission control line (where k is a natural number greater than 0); a first capacitor connected between the first node and the third node; a second capacitor connected between the third node and a reference power line to which reference power is supplied; a third capacitor connected between the second node and the third node; and a light-emitting element connected between the second node and a second power line to which second driving power is supplied.

In an embodiment, the pixel disposed on the i-th pixel row and the j-th pixel column may further include a fourth transistor including a first electrode connected to the second node, and a second electrode electrically connected to a third power line to which initialization power is supplied. The fourth transistor may be turned on when a second scan signal is supplied to a second scan line.

In an embodiment, a voltage level of the reference power may be lower than a voltage level of the first driving power, and be higher than a voltage level of the initialization power.

In an embodiment, a voltage level of the reference power may be equal to a voltage level of the first driving power. The reference power line may be the first power line.

In an embodiment, each of the first to the fourth transistors may include a MOSFET including a body electrode, and the voltage of the first driving power may be supplied to the body electrode.

An embodiment of the disclosure provides an electronic device including a processor to provide input image data, and an display device to display an image based on the input image data. The display device includes including pixels connected to write scan lines, initialization scan lines, data lines, and emission control lines. Among the pixels, a pixel disposed on an i-th pixel row (where i is a natural number greater than 0) and a j-th pixel column (where j is a natural number greater than 0) includes: a first transistor including a first electrode connected to a first node, a second electrode connected to a second node, and a gate electrode connected to a third node; a second transistor connected between a j-th data line among the data lines and the third node, and configured to be turned on when a first scan signal is supplied to a first scan line among the write scan lines; a third transistor connected between a first power line to which a voltage of first driving power is supplied and the first node, and configured to be turned off when an emission control signal is supplied to a k-th emission control line (where k is a natural number greater than 0); a first capacitor connected between the first node and the third node; a second capacitor connected between the third node and a reference power line to which reference power is supplied; a third capacitor connected between the second node and the third node; and a light-emitting element connected between the second node and a second power line to which second driving power is supplied.

BRIEF DESCRIPTION OF THE DRAWINGS

The above and other exemplary embodiments, advantages and features of this disclosure will become more apparent by describing in further detail exemplary embodiments thereof with reference to the accompanying drawings, in which.

DETAILED DESCRIPTION

Figure 1:
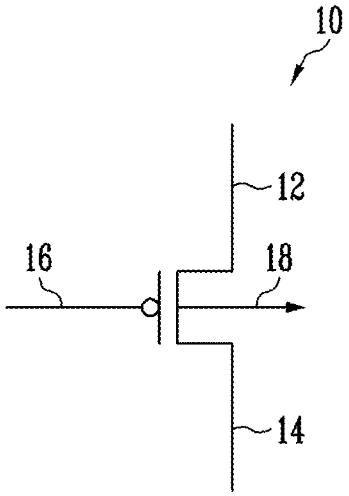
FIG. 1 is a diagram illustrating an embodiment of a transistor in accordance with the disclosure.

Hereinafter, embodiments of the disclosure will be described in detail with reference to the attached drawings, such that those skilled in the art may easily implement the disclosure. The disclosure may be embodied in various different forms without being limited to embodiments to be described herein.

In the drawings, portions unrelated to the disclosure have been omitted to clarify the description of the disclosure, and the same reference numerals are used throughout the different drawings to designate the same or similar components.

It will be understood that when an element is referred to as being "coupled" or "connected" to another element, it may be directly coupled or connected to the other element or intervening elements may be therebetween. The terminology used herein is for the purpose of describing particular embodiments only and is not intended to be limiting. In the specification, when an element is referred to as "comprising" or "including" a component, it does not preclude another component but may further include other components unless the context clearly indicates otherwise. "at least one of X, Y, and Z" and "at least one selected from the group consisting of X, Y, and Z" may be construed as X only, Y only, Z only, or any combination of two or more of X, Y, and Z (for instance, XYZ, XYY, YZ, and ZZ). As used herein, the term "and/or" may include any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

FIG. 1 is a diagram illustrating an embodiment of a transistor 10 in accordance with the disclosure.

Referring to FIG. 1, the transistor 10 in an embodiment of the disclosure may include a first electrode 12, a second electrode 14, a gate electrode 16, and a body electrode 18. In an embodiment, the transistor 10 may be a metal-oxide-semiconductor field-effect transistor ("MOSFET"), for example. The transistor 10 (e.g., an MOSFET) including the body electrode 18 is suitable for implementing a high-resolution pixel due to a reduced mounting area thereof.

The transistor 10 may be formed on a silicon wafer. In an embodiment, a panel may be implemented by stacking layers such as a transistor layer, an emission layer, and a cover layer on the silicon wafer. However, the foregoing description is illustrative, and the transistor 10 may be formed on various known substrates (e.g., a glass substrate), for example.

The first electrode 12 of the transistor 10 may be set to a source electrode (or a drain electrode), and the second electrode 14 thereof may be set to a drain electrode (or a source electrode). In the case where the transistor 10 includes the body electrode 18, a threshold voltage of the transistor 10 may be changed by body effect. The body effect refers to a change in the threshold voltage of the transistor 10 due to a voltage difference between the body electrode 18 and the first electrode 12 of the transistor 10.

In embodiments of the disclosure, threshold voltage compensation may be achieved while using the transistor 10 including the body electrode 18 as a driving transistor.

Figure 2:
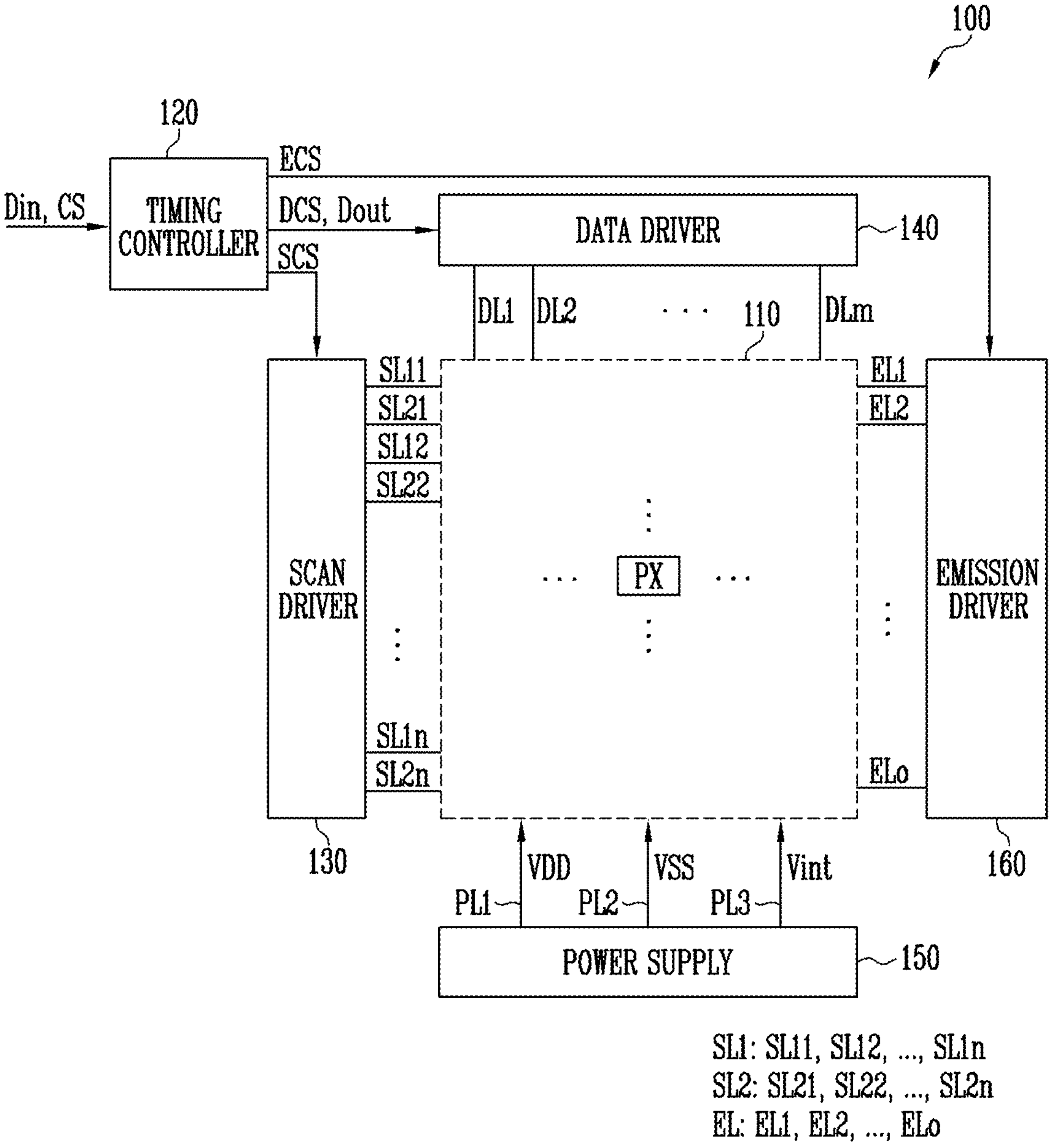
FIG. 2 is a block diagram illustrating an embodiment of a display device in embodiments of the disclosure.
Figure 3:
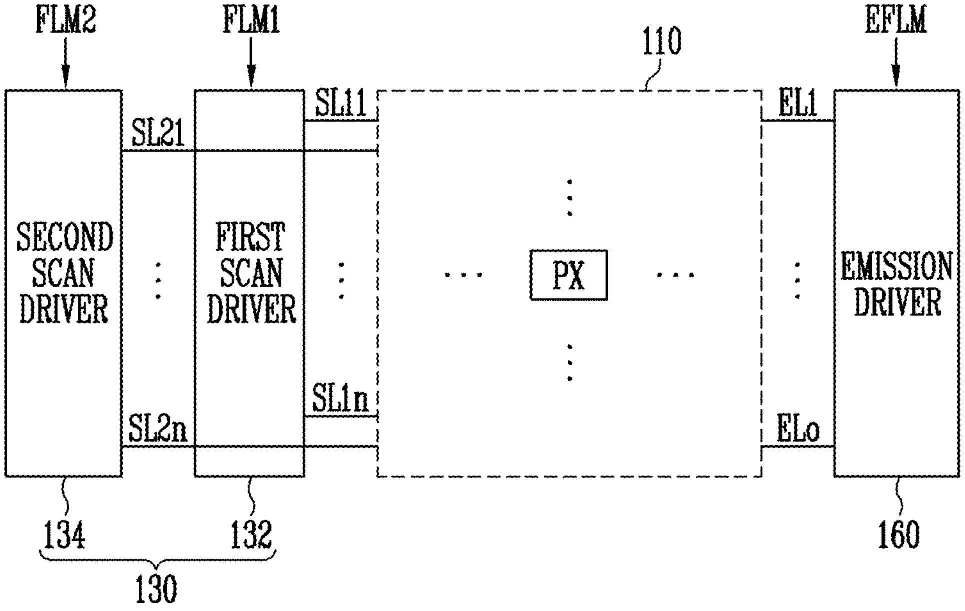
FIG. 3 is a block diagram illustrating an embodiment of a scan driver, a data driver, and a power supply illustrated in FIG. 2.

FIG. 2 is a diagram illustrating a display device 100 in accordance with the disclosure. FIG. 3 is a block diagram illustrating an embodiment of a scan driver 130, a data driver 140, and a power supply 150 illustrated in FIG. 2.

Referring to FIG. 2, the display device 100 in an embodiment of the disclosure may include a pixel component 110 (or a panel), a timing controller 120, a scan driver 130, a data driver 140, a power supply 150, and an emission driver 160. The aforementioned components may be implemented as separate integrated circuits. Two or more components of the aforementioned components may be implemented into a single integrated circuit. Furthermore, the scan driver 130 and/or the emission driver 160 may be formed in the pixel component 110.

The pixel component 110 may include pixels PX connected to write scan lines SL11 to SL1$n$, initialization scan lines SL21 to SL2$n$, data lines DL1 to DLm, emission control lines EL1 to ELo, and power lines PL1, PL2, and PL3 (where n, m, and o each are a natural number greater than 0).

In an embodiment, a pixel PXij (refer to FIG. 4) disposed on an i-th horizontal line (or pixel row) and a j-th vertical line (or pixel column) may be connected to an i-th write scan line (also referred to as a first scan line) SL1$i$, an i-th initialization scan line (also referred to as a second scan line) SL2$i$, a k-th emission control line ELk, and a j-th data line DLj (where i is a natural number greater than 0 and equal to or less than n, j is a natural number greater than 0 and equal to or less than m, and k is a natural number greater than 0 and equal to or less than 0), for example. Here, k is a number identical to or less than i. In an embodiment, in the case where each of the emission control lines EL1 to ELo is connected to pixels PX disposed on one horizontal line, k is a number identical to i, for example. In an embodiment, in the case where each of the emission control lines EL1 to ELo is connected to pixels PX disposed on two or more horizontal lines, k is a number less than i, for example.

The pixels PX may be selected on a horizontal line basis (e.g., pixels PX connected to the same scan line may be grouped into one horizontal line (or a pixel row)) when a first scan signal is supplied to each of the write scan lines SL11 to SL1$n$. Each of the pixels PX that are selected by the first scan signal may receive a data signal from a corresponding data line (any one of DL1 to DLm) connected therewith. The pixels PX that receive data signal may generate light of a predetermined luminance corresponding to the voltage of the data signal.

The timing controller 120 may receive input data Din and a control signal CS from a host system through an interface. In an embodiment, the timing controller 120 may receive input data Din and a control signal CS from at least one of a graphics processing unit ("GPU"), a central processing unit ("CPU"), and an application processor ("AP") that are included in the host system, for example. The control signal CS may include various signals including a clock signal.

The timing controller 120 may generate a scan driving signal SCS, a data driving signal DCS, and an emission driving signal ECS, based on the control signal CS. The scan driving signal SCS, the data driving signal DCS, and the emission driving signal ECS may be respectively supplied to the scan driver 130, the data driver 140, and the emission driver 160.

The timing controller 120 may rearrange the input data Din to match specifications of the display device 100. Furthermore, the timing controller 120 may correct the input data Din to generate output data Dout, and supply the output data Dout to the data driver 140. In an embodiment, the timing controller 120 may correct the input data Din based on optical measurement results obtained during a fabrication process.

The scan driver 130 may receive a scan driving signal SCS from the timing controller 120. The scan driving signal SCS may include at least one scan start signal and clock signals desired for driving the scan driver 130. The scan driver 130 may generate a first scan signal and a second scan signal, while shifting the scan start signal in response to the clock signals.

To achieve the foregoing purpose, as illustrated in FIG. 3, the scan driver 130 may include a first scan driver 132 and a second scan driver 134.

The first scan driver 132 may receive a first scan start signal FLM1 and generate first scan signals while shifting the first scan start signal FLM1 in response to a clock signal. The first scan driver 132 may sequentially supply the first scan signals to the write scan lines SL11 to SL1$n$.

The second scan driver 134 may receive a second scan start signal FLM2 and generate second scan signals while shifting the second scan start signal FLM2 in response to a clock signal. The second scan driver 134 may sequentially supply the second scan signals to the initialization scan lines SL21 to SL2$n$. Each of the first scan signals and the second scan signals may be set to a gate-on voltage to allow the transistors included in the pixels PX to be turned on.

In an embodiment, a first scan signal and a second scan signal of a relatively low level may be supplied to a P-type transistor, for example. A first scan signal and a second scan signal of a relatively high level may be supplied to an N-type transistor. A transistor supplied with a first scan signal or a second scan signal may be turned on in response to the first scan signal or the second scan signal. Hereinafter, the supply of the first scan signal and the second scan signal may indicate that a gate-on voltage is supplied to the write scan lines SL1 and the initialization scan lines SL2. The absence of the first scan signal and the second scan signal may indicate that a gate-off voltage is supplied to the write scan lines SL1 and the initialization scan lines SL2.

Although FIG. 3 illustrates that the first scan driver 132 and the second scan driver 134 are respectively connected to the write scan lines SL1 and the initialization scan lines SL2, the embodiments of the disclosure are not limited thereto. In an embodiment, the write scan lines SL1 and the initialization scan lines SL2 may be driven by a single scan driver, for example.

The data driver 140 may receive output data Dout and a data driving signal DCS from the timing controller 120. The data driving signal DCS may include a sampling signal and/or timing signals desired for driving the data driver 140.

The data driver 140 may generate data signals, based on the data driving signal DCS and the output data Dout. In an embodiment, the data driver 140 may generate an analog data signal, based on a grayscale value of the output data Dout, for example.

The data driver 140 may apply predetermined voltages to the data lines DL1 to DLm based on the generated analog data signal. In an embodiment, referring to FIG. 5, the data driver 140 may supply a voltage Vdata (refer to FIG. 5) of a data signal DATA (refer to FIG. 5) to each of the data lines DL1 to DLm during a first horizontal period 1H (refer to FIG. 5), for example.

The power supply 150 may generate various types of power desired for driving the display device 100. In an embodiment, the power supply 150 may generate first driving power VDD, second driving power VSS, and initialization power Vint, for example.

The first driving power VDD may be provided to supply driving current to the pixels PX. The second driving power VSS may be provided to receive the driving current from the pixels PX. During a period in which the pixels PX are set to an emission state, the first driving power VDD may be set to a voltage higher than that of the second driving power VSS.

The initialization power Vint may be a voltage provided to initialize a first electrode (or an anode electrode) of a light-emitting element LD (refer to FIG. 4) included in each of the pixels PX. The initialization power Vint may have a voltage value causing the light-emitting element LD to be turned off when supplied to the first electrode of the light-emitting element LD.

Generated from the power supply 150, the first driving power VDD may be supplied to the first power line PL1, the second driving power VSS may be supplied to the second power line PL2, and the initialization power Vint may be supplied to the third power line PL3. The first power line PL1, the second power line PL2, and the third power line PL3 may be connected in common to the pixels PX, but embodiments of the disclosure are not limited thereto.

In an embodiment, the first power line PL1 may be configured of a plurality of power lines. The power lines may be connected to different pixels PX. In an embodiment, the second power line PL2 may be configured of a plurality of power lines. The power lines may be connected to different pixels PX. In an embodiment, the third power line PL3 may be configured of a plurality of power lines. The power lines may be connected to different pixels PX. In an embodiment of the disclosure, the pixels PX may be connected to any one of the first power lines PL1, any one of the second power lines PL2, and any one of the third power lines PL3.

Figure 4:
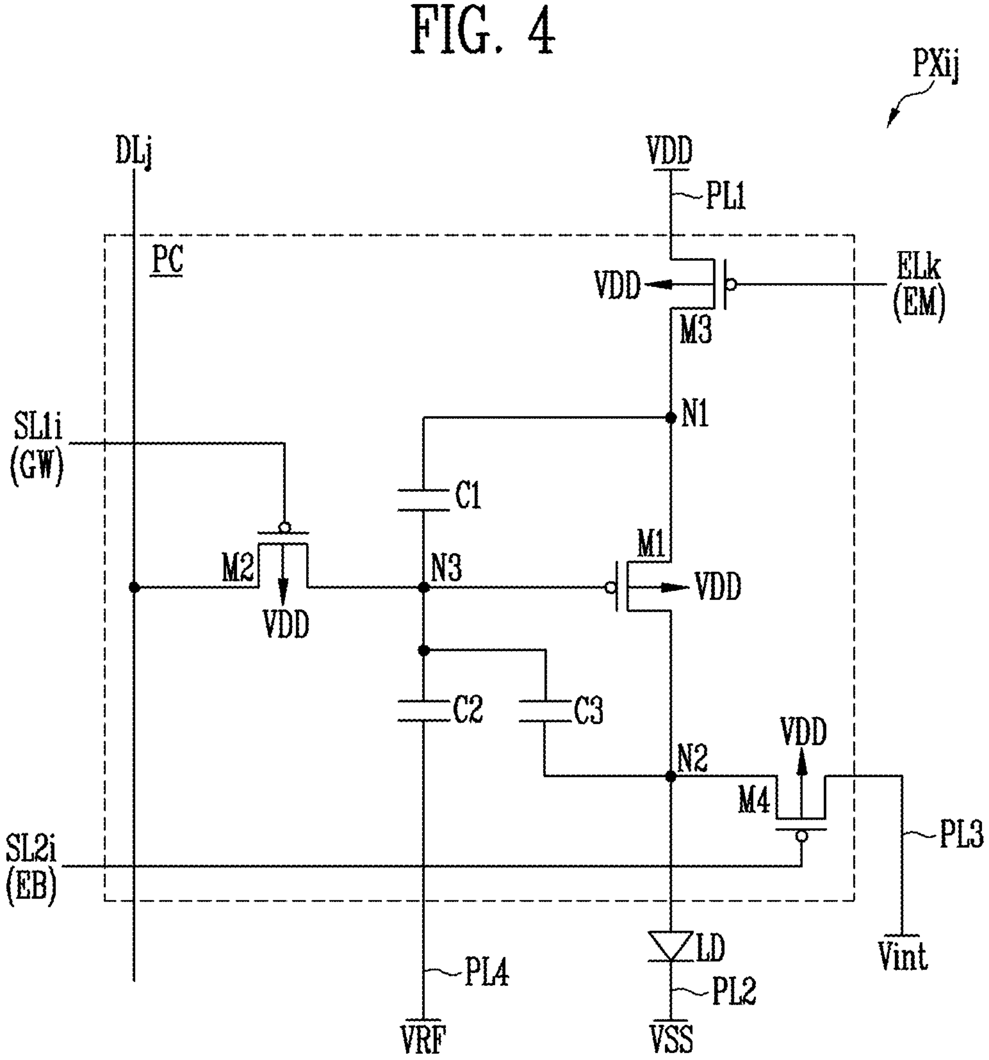
FIG. 4 is a circuit diagram illustrating an embodiment of a pixel illustrated in FIG. 2.

In an embodiment, the power supply 150 may generate reference power VRF (refer to FIG. 4), and supply the reference power VRF to a fourth power line PL4 (refer to FIG. 4). The pixels PX may be connected to the first to fourth power lines PL1 to PL4.

The emission driver 160 may receive an emission driving signal ECS from the timing controller 120. The emission driving signal ECS may include an emission start signal EFLM and clock signals desired for driving the emission driver 160. The emission driver 160 may generate emission control signals while shifting the emission start signal EFLM in response to a clock signal. The emission driver 160 may successively supply the emission control signals to the emission control lines EL1 to ELo. The emission control signal may be set to a gate-off voltage, thus allowing the transistors included in the pixels PX to be turned off.

In an embodiment, an emission control signal of a relatively high level may be supplied to a P-type transistor, and an emission control signal of a relatively low level may be supplied to an N-type transistor, for example. A transistor supplied with an emission control signal may be turned off in response to the emission control signal. Thereafter, the supply of the emission control signal may indicate that a gate-off voltage is supplied to the emission control lines EL. The absence of the emission control signal may indicate that a gate-on voltage is supplied to the emission control lines EL.

FIG. 4 is a diagram illustrating an embodiment of the pixel illustrated in FIG. 2. In FIG. 4, there is illustrated a pixel PXij disposed on an i-th horizontal line and a j-th vertical line.

Referring to FIG. 4, the pixel PXij in an embodiment of the disclosure may be connected to corresponding signal lines SL1*i*, SL2*i*, ELk, and DLj. In an embodiment, the pixel PXij may be connected to an i-th write scan line SL1*i*, an i-th initialization scan line SL2*i*, a k-th emission control line ELk, and a j-th data line DLj, for example. In an embodiment, the pixel PXij may also be connected to the first power line PL1, the second power line PL2, the third power line PL3, and the fourth power line PL4.

The pixel PXij in an embodiment of the disclosure may include a light-emitting element LD, and a pixel circuit PC which controls the amount of current to be supplied to the light-emitting element LD.

The light-emitting element LD may be connected between the first power line PL1 and the second power line PL2. In an embodiment, a first electrode (or an anode electrode) of the light-emitting element LD may be electrically connected to the first power line PL1 via a second node N2, a first transistor M1, a first node N1, and a third transistor M3, for example. A second electrode (or a cathode electrode) of the light-emitting element LD may be electrically connected to the second power line PL2. The light-emitting element LD may generate light of a predetermined luminance corresponding to the amount of current that is supplied from the first power line PL1 to the second power line PL2 via the pixel circuit.

An organic light-emitting diode may be selected as the light-emitting element LD. Furthermore, an inorganic light-emitting diode such as a micro light-emitting diode ("LED") or a quantum dot light-emitting diode may be selected as the light-emitting element LD. The light-emitting element LD may be an element including or consisting of a combination of organic material and inorganic material. Although FIG. 4 illustrates that the pixel PXij includes a single light-emitting element LD, the pixel PXij in an embodiment may include a plurality of light-emitting elements LD. The plurality of light-emitting elements LD may be connected in series, parallel or series-parallel to each other.

The pixel circuit PC may include the first transistor M1, a second transistor M2, the third transistor M3, a fourth transistor M4, a first capacitor C1, a second capacitor C2, and a third capacitor C3.

Each of the first to fourth transistors M1 to M4 may be a transistor including a body electrode. In an embodiment, each of the first to fourth transistors M1 to M4 may include a metal oxide semiconductor field effect transistor ("MOSFET"), for example. In this case, the first to fourth transistors M1 to M4 may be disposed (e.g., mounted) in a relatively small area, thus allowing the pixel PXij to be applied to a high-resolution panel. The body electrode of the first to fourth transistors M1 to M4 may be supplied with first driving power VDD. In an embodiment, the body electrode of each of the first to fourth transistors M1 to M4 may be electrically connected to the first power line PL1, for example.

In an embodiment, each of the first to fourth transistors M1 to M4 may include a P-type transistor. However, the aforementioned example is illustrative, and at least one of the first to fourth transistors M1 to M4 may be substituted with an N-type transistor.

The first transistor M1 may include a first electrode connected to the first node N1, and a second electrode connected to the second node N2. Here, the term "connected" implies being electrically linked or joined. A gate electrode of the first transistor M1 may be connected to a third node N3. The first node N1 may refer to a node to which a second electrode of the third transistor M3 is connected. The second node N2 may refer to a node to which the first electrode of the light-emitting element LD is connected. The first transistor M1 may control, in response to the voltage of the third node N3, the amount of current to be supplied from the first driving power VDD to the second driving power VSS via the light-emitting element LD.

The second transistor M2 may be connected between the data line DLj and the third node N3. A gate electrode of the second transistor M2 may be electrically connected to the i-th write scan line SL1*i*. When a first scan signal GW is supplied to the i-th write scan line SL1*i*, the second transistor M2 may be turned on to electrically connect the data line DLj with the third node N3.

A first electrode of the third transistor M3 may be electrically connected to the first power line PL1, and the second electrode thereof may be connected to the first node N1. A gate electrode of the third transistor M3 may be electrically connected to the emission control line ELk. The third transistor M3 may be turned off when an emission control signal is supplied to the emission control line ELk, and may be turned on when no emission control signal is supplied thereto. When the third transistor M3 is turned off, the first power line PL1 and the first node N1 may be electrically disconnected.

The fourth transistor M4 may include a first electrode connected to the second node N2, and a second electrode electrically connected to the third power line PL3. A gate electrode of the fourth transistor M4 may be electrically connected to the i-th initialization scan line SL2*i*. When a second scan signal EB is supplied to the i-th initialization scan line SL2*i*, the fourth transistor M4 may be turned on to electrically connect the second node N2 with the third power line PL3.

The first capacitor C1 may be connected between the first node N1 and the third node N3. The first capacitor C1 may be driven as a coupling capacitor, thus transmitting a variation in voltage of the first node N1 to the third node N3. Furthermore, the first capacitor C1 may store the voltage of the third node N3.

The second capacitor C2 may be connected between the third node N3 and the fourth power line PL4 to which the reference power VRF is supplied. A voltage level of the reference power VRF may be set within a range that does not exceed a maximum voltage of the second capacitor C2. In an embodiment, the voltage level of the reference voltage VRF may be lower than that of the first driving power VDD and higher than that of the initialization power Vint.

In other embodiments, the voltage level of the reference power VRF may be equal to that of the first driving power VDD. In this case, the second capacitor C2 may be connected between the third node N3 and the first power line PL1 to which the first driving power VDD is supplied.

The third capacitor C3 may be connected between the second node N2 and the third node N3. The third capacitor C3 may be driven as a coupling capacitor, thus transmitting a variation in voltage of the second node N2 to the third node N3.

In an embodiment, each of the first to third capacitors C1 to C3 may include a metal-oxide-metal ("MOM") capacitor or a metal-insulator-metal ("MIM") capacitor.

In an embodiment, each of the first and second capacitors C1 and C2 may include an MOM capacitor or an MIM capacitor, and the third capacitor C3 may include a parasitic capacitor.

Figure 5:
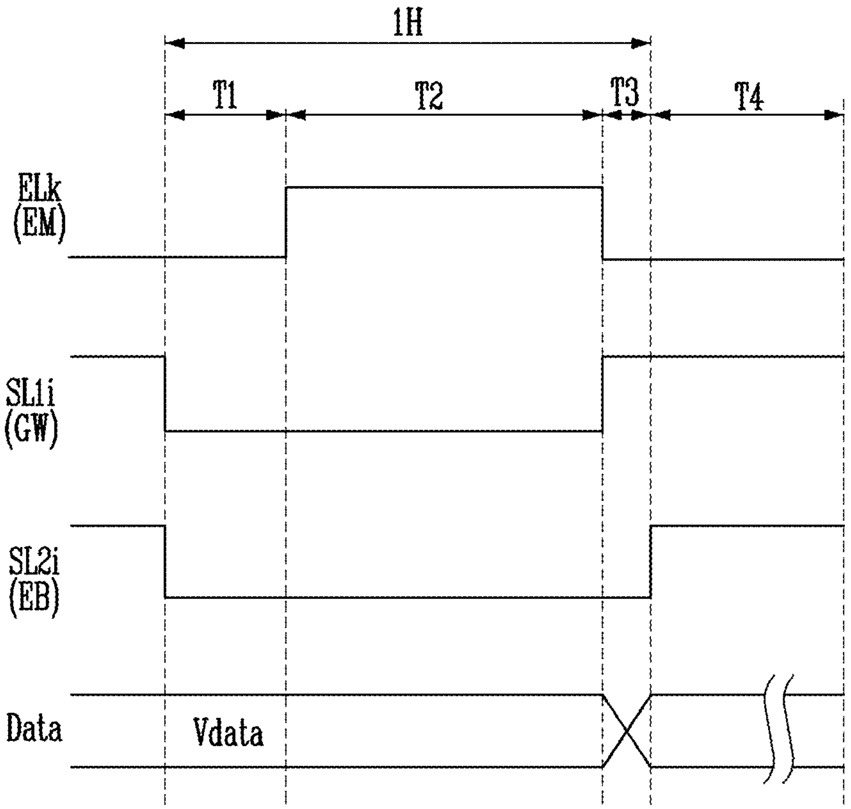
FIG. 5 is a wavelength diagram illustrating an embodiment of a method of driving the pixel illustrated in FIG. 4.

FIG. 5 is a wavelength diagram illustrating an embodiment of a method of driving the pixel illustrated in FIG. 4.

Referring to FIGS. 2, 4, and 5, a horizontal period 1H (or a predetermined horizontal period) in which a data signal is supplied to the pixel PXij disposed on the i-th horizontal line and the j-th vertical line may be divided into a first period T1, a second period T2, and a third period T3. A start time point of the second period T2 may be after an end time point of the first period T1. A start time point of the third period T3 may be after an end time point of the second period T2. After the horizontal period 1H, a fourth period T4 during which the light-emitting element LD emits light may start. A start time point of the fourth period T4 may be after an end time point of the third period T3.

The data driver 140 may supply a voltage Vdata of a data signal DATA to the data line DLj during the first to third periods T1 to T3.

The scan driver 130 (or the first scan driver 132) may supply a first scan signal GW to the i-th write scan line SL1*i* during the first and second periods T1 and T2.

The scan driver 130 (or the second scan driver 134) may supply a second scan signal EB to the i-th initialization scan line SL2*i* during the first to third periods T1 to T3.

The emission driver 160 may supply an emission control signal EM to the emission control line ELk during the first period T1, the third period T3, and the fourth period T4.

The first period T1 may be a period during which a voltage of the first driving power VDD is applied to the first node N1, a voltage of the initialization power Vint is supplied to the second node N2, and the voltage Vdata of the data signal DATA is supplied to the third node N3. During the first period T1, the light-emitting element LD may be initialized. During the first period T1, the first capacitor C1, the second capacitor C2, and the third capacitor C3 may be initialized and, simultaneously, may store the voltage Vdata of the data signal DATA supplied to the third node N3. The first period T1 may be also referred to as an initialization period and a data signal write period.

The second period T2 may be a period during which the voltage of the initialization power Vint is supplied to the second node N2, and the voltage Vdata of the data signal DATA is supplied to the third node N3. During the second period T2, a voltage corresponding to the threshold voltage of the first transistor M1 may be stored in the first capacitor C1. The second period T2 may be also referred to as a first threshold voltage compensation period.

During the third period T3, the first transistor M1 may control the amount of current to be supplied from the first driving power VDD to the initialization power Vint in response to the voltage of the third node N3. In this case, unnecessary current may be prevented from being supplied to the light-emitting element LD after the second period T2. The third period T3 may be also referred to as a luminance control period.

During the fourth period T4, the first transistor M1 may control, in response to the voltage of the third node N3, the amount of current flowing from the first driving power VDD to the second driving power VSS via the light-emitting element LD. During the fourth period T4, the light-emitting element LD may emit light at a luminance corresponding to the amount of current supplied from the first transistor M1. The fourth period T4 may be also referred to as an emission period.

FIGS. 6 to 9 are circuit diagrams illustrating operation processes of the pixel in response to signals of FIG. 5. A pixel circuit PC of FIGS. 6 to 9 may correspond to the pixel circuit PC of FIG. 5.

Figure 6:
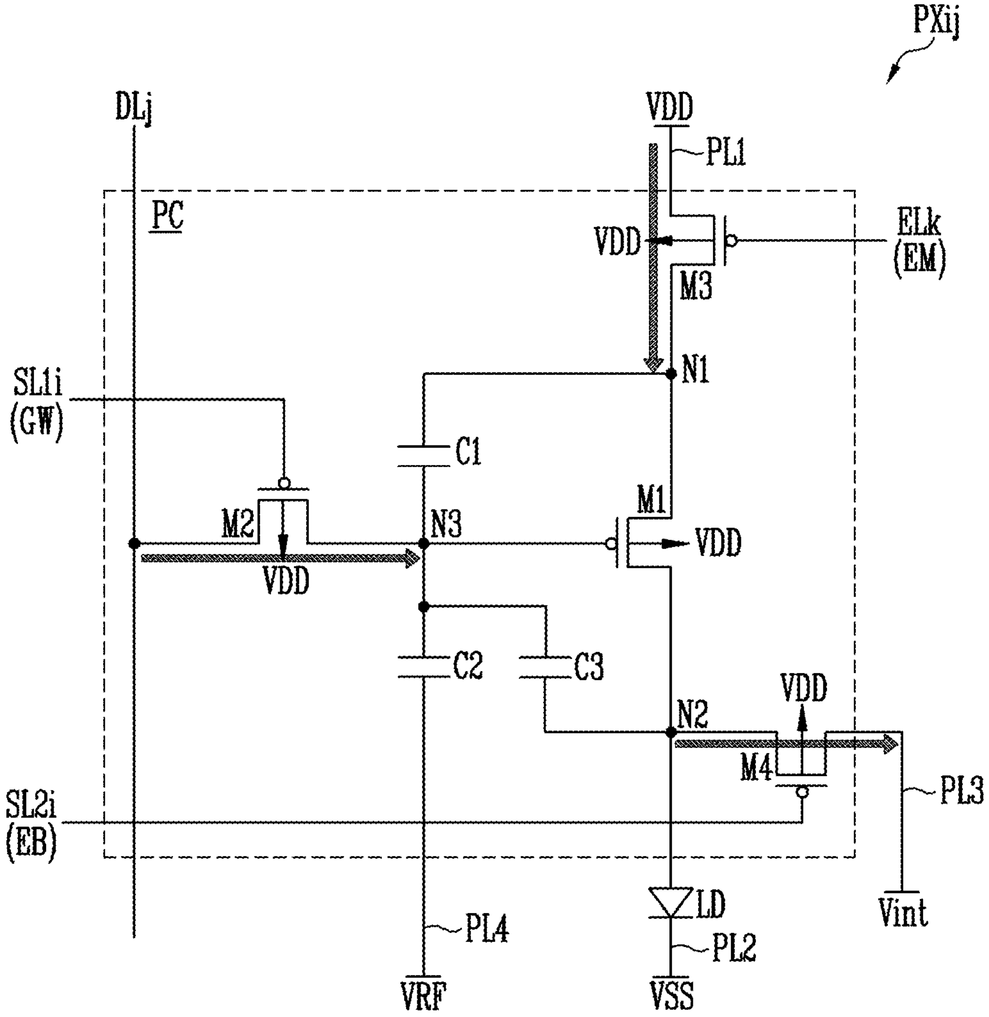
FIGS. 6 to 9 are circuit diagrams illustrating operation processes of the pixel in response to signals of FIG. 5.

Referring to FIG. 6, during the first period T1, a first scan signal GW is supplied to the i-th write scan line SL1*i*, and a second scan signal EB is supplied to the i-th initialization scan line SL2*i*. During the first period T1, an emission control signal EM is not supplied to the emission control line ELk. Hence, the third transistor M3 may be set to a turn-on state. When the third transistor M3 is turned on, the voltage of the first driving power VDD is supplied to the first node N1.

When the first scan signal GW is supplied to the i-th write scan line SL1*i*, the second transistor M2 is turned on. When the second transistor M2 is turned on, the voltage Vdata of the data signal DATA is supplied from the data line Dj to the third node N3. Here, the first capacitor C1 may be initialized by the voltage Vdata of the data signal DATA and the voltage of the first driving power VDD. In an embodiment, the first capacitor C1 may charge a voltage corresponding to the voltage Vdata of the data signal DATA and the first driving power VDD regardless of a voltage charged in a preceding period (or a preceding frame period) during the first period T1, for example.

When the second scan signal EB is supplied to the i-th initialization scan line SL2*i*, the fourth transistor M4 is turned on. When the fourth transistor M4 is turned on, the voltage of the initialization power Vint is supplied to the second node N2. When the voltage of the initialization power Vint is supplied to the second node N2, the light-emitting element LD may be initialized. In an embodiment, when the voltage of the initialization power Vint is supplied, parasitic capacitance of the light-emitting element LD may be discharged, for example. Here, the voltage of the initialization power Vint may be set to a voltage at which the light-emitting element LD is turned off (or does not emit light). As a result, the light-emitting element LD may be set to a non-emission state.

The second capacitor C2 may be initialized by the voltage Vdata of the data signal DATA supplied through the data line DLj. In an embodiment, the second capacitor C2 may charge a voltage corresponding to the voltage Vdata of the data signal DATA and the reference power VRF regardless of a voltage charged in a preceding period (or a preceding frame period) during the first period T1, for example.

The third capacitor C3 may be initialized by the voltage Vdata of the data signal DATA supplied to the third node N3 and the voltage of the initialization power Vint supplied to the second node N2. In an embodiment, the third capacitor C3 may charge a voltage corresponding to the voltage Vdata of the data signal DATA and the initialization power Vint regardless of a voltage charged in a preceding period (or a preceding frame period) during the first period T1, for example.

During the first period T1, current supplied from the first transistor M1 may be supplied to the initialization power Vint via the fourth transistor M4 in response to the voltage of the third node N3. Therefore, during the first period T1, the light-emitting element LD may be maintained in the non-emission state.

Figure 7:
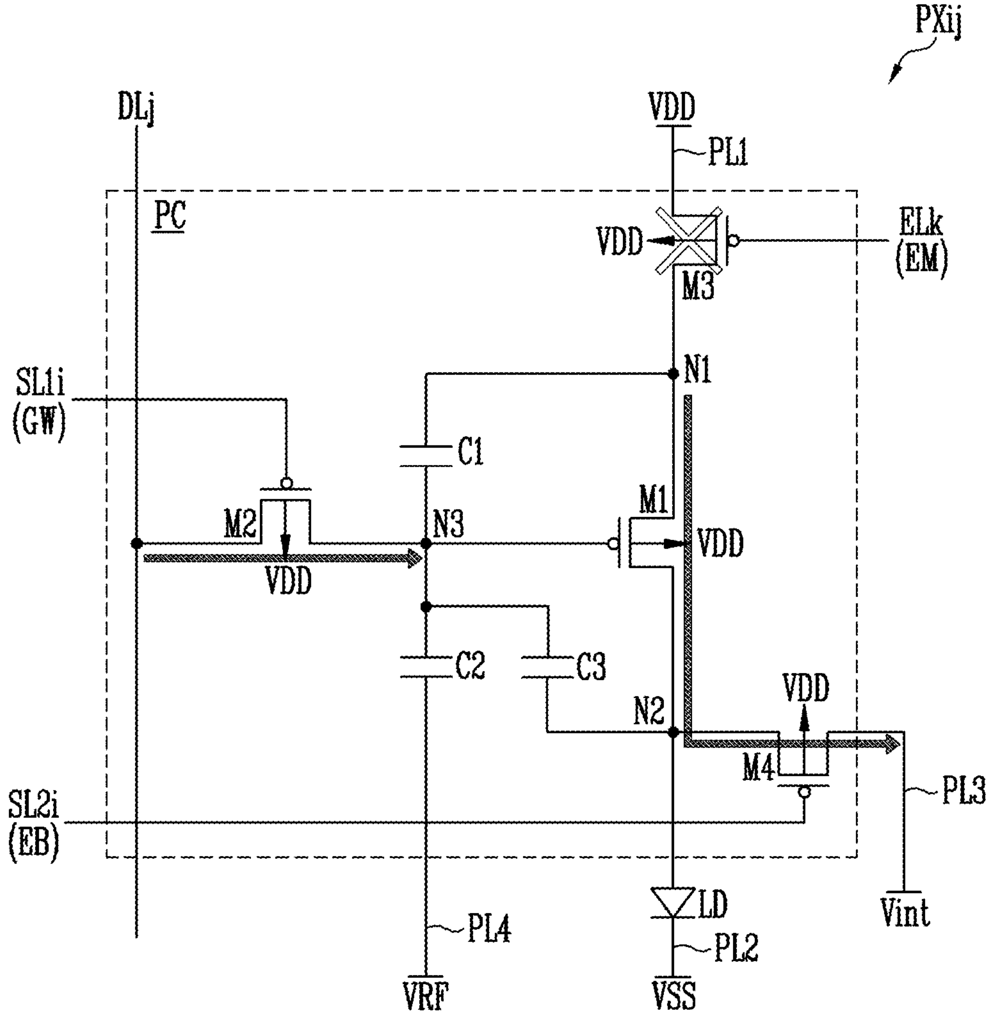

Referring to FIG. 7, during the second period T2, the second transistor M2 may be maintained in a turn-on state by the first scan signal GW supplied to the i-th write scan line SL1*i*, and the fourth transistor M4 may be maintained in a turn-on state by the second scan signal EB supplied to the i-th initialization scan line SL2*i*.

During the second period T2, the third transistor M3 may be turned off by the emission control signal EM supplied to the emission control line ELk. When the third transistor M3 is turned off, the electrical connection between the first power line PL1 and the first node N1 may be interrupted.

Since the second transistor M2 is set to the turn-on state during the second period T2, the voltage Vdata of the data signal DATA is supplied from the data line DLj to the third node N3. In this case, the voltage of the first node N1 may decrease from the voltage of the first driving power VDD to a voltage (Vdata+|Vth(M1)|) obtained by adding an absolute threshold voltage of the first transistor M1 to the voltage Vdata of the data signal DATA.

In other words, during the second period T2, the third node N3 may be set to the voltage Vdata of the data signal DATA, and the first node N1 may be set to a voltage (Vdata+|Vth(M1)|) obtained by adding the absolute threshold voltage of the first transistor M1 to the voltage Vdata of the data signal DATA. Therefore, during the second period T2, the threshold voltage of the first transistor M1 may be stored in the first capacitor C1.

Since the fourth transistor M4 is set to the turn-on state during the second period T2, current supplied from the first node N1 to the second node N2 via the first transistor M1 may be supplied to the initialization power Vint via the fourth transistor M4. Therefore, during the second period T2, the light-emitting element LD may be maintained in the non-emission state.

Figure 8:
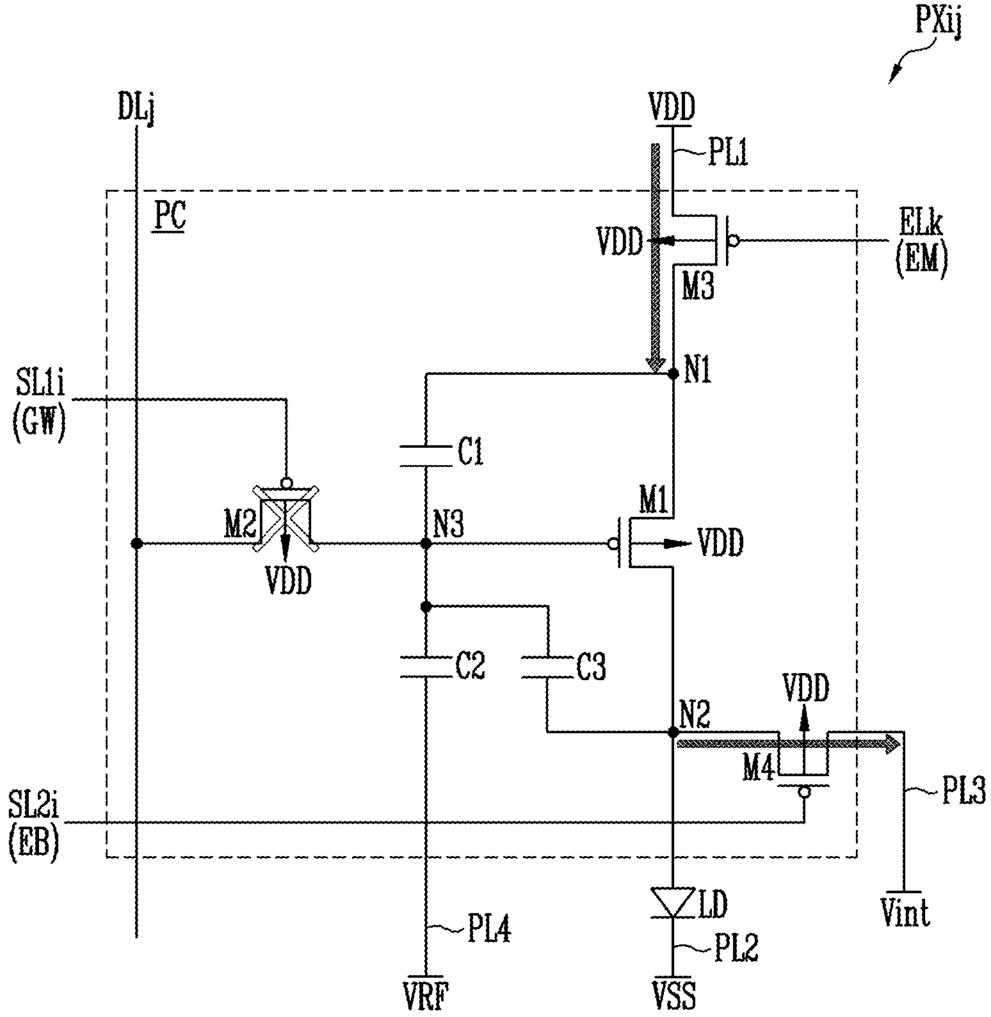

Referring to FIG. 8, during the third period T3, the supply of the emission control signal EM to the emission control line ELk is interrupted, so that the third transistor M3 may be set to the turn-on state. In addition, during the third period T3, the supply of the first scan signal GW to the i-th write scan line SL1*i* may be interrupted, so that the second transistor M2 may be set to a turn-off state. During the third period T3, the supply of the second scan signal EB to the i-th initialization scan line SL2*i* is maintained, so that the fourth transistor M4 remains turned on.

During the third period T3, as the third transistor M3 is set to the turn-on state, the first driving power VDD is supplied to the first node N1, and as the second transistor M2 is set to the turn-on state, the voltage Vdata of the data signal DATA is supplied from the data line DLj to the third node N3. Consequently, the voltage of the third node N3 may be the sum of the voltage Vdata of the data signal DATA and a value (α(VDD−(Vdata+|Vth(M1)|))) on which a difference between the voltage of the first node N1 and the voltage of the first driving power VDD during the second period T2 is reflected.

The first transistor M1 may control the amount of current supplied from the first driving power VDD to the second node N2 in response to the voltage applied to the third node N3.

Here, because the fourth transistor M4 is set to the turn-on state, current supplied to the second node N2 may be supplied to the initialization power Vint. Consequently, during the third period T3, the light-emitting element LD may be set to a non-emission state, thereby making accurate grayscale representation of the display device 100 possible. In an embodiment, while passing through the second period T2, the voltage of the second node N2 may increase to a voltage higher than a desired voltage, for example. Accordingly, unintended current may be supplied to the light-emitting element LD. In an embodiment, even when a black gray scale is implemented in the pixel PXij, the light-emitting element LD may temporarily emit light, for example. In an embodiment of the disclosure, during the third period T3, current supplied from the first transistor M1 may be supplied to the initialization power Vint, thereby preventing unintended light emission of the light-emitting element LD.

Figure 9:
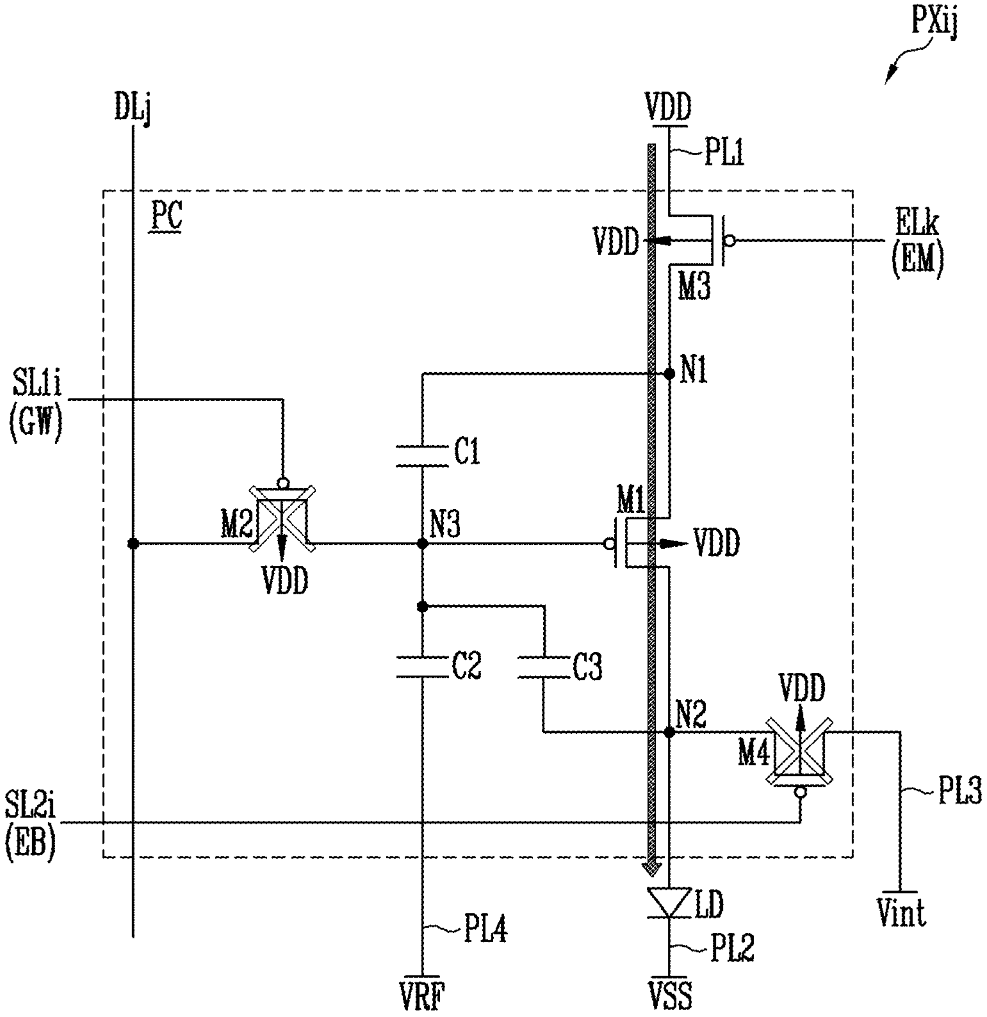

Referring to FIG. 9, during the fourth period T4, the supply of the second scan signal EB to the i-th initialization scan line SL2*i* is interrupted, so that the fourth transistor M4 is turned off. During the fourth period T4, the first scan signal GW is not supplied to the i-th write scan line SL1*i*, so that the second transistor M2 remains turned off. During the fourth period T4, the emission control signal EM is not supplied to the emission control line ELk. Hence, the third transistor M3 remains turned on.

Here, the first transistor M1 may control, in response to the voltage of the third node N3, the amount of current to be supplied from the first driving power VDD to the second driving power VSS via the light-emitting element LD. During the fourth period T4, the light-emitting element LD may generate light at a luminance corresponding to the amount of driving current supplied from the first transistor M1.

A threshold voltage compensation process in embodiments of the disclosure will be described in detail with reference to FIGS. 6 to 9.

Referring to FIG. 7, the threshold voltage of the first transistor M1 may be determined by a voltage difference between the body electrode and the source electrode (e.g., the first node N1). In an embodiment, on the assumption that the voltage of the first driving power VDD is set to 8 volts (V), the body electrode of the first transistor M1 may be set to 8 V during the second period T2, while the source electrode thereof may be set to a voltage lower than that of the body electrode, for example. In an embodiment, on the assumption that the first node N1 is set to 4 V, a voltage difference between the body electrode and the source electrode of the first transistor M1 may be set to 4 V (e.g., VBS=4 V), for example. Here, the first transistor M1 may have a first threshold voltage corresponding to 4 V that is a voltage difference between the body electrode and the source electrode.

In the second period T2, the first threshold voltage may be compensated for. In an embodiment, during the second period T2, the third node N3 is set to the voltage Vdata of the data signal DATA, and the first node N1 is set to a voltage (Vdata+|Vth(M1)|) obtained by adding the absolute threshold voltage of the first transistor M1 to the voltage Vdata of the data signal DATA, for example. The threshold voltage of the first transistor M1 may be stored in the first capacitor C1. In an embodiment of the disclosure, during the second period T2, the threshold voltage of the first transistor M1 may be primarily compensated for. In an embodiment, after the second period T2, the third transistor M3 may be turned on, thereby enabling the threshold voltage reflected in the first node N1 to be reflected in the voltage of the third node N3, for example. Based on the voltage of the third node N3, the turn-on and/or turn-off of the first transistor M1 may be controlled. Consequently, the first threshold voltage of the first transistor M1 may be compensated for.

Referring to FIG. 8, during the third period T3, the first node N1 may be set to the voltage of the first driving power VDD. Accordingly, the source electrode of the first transistor M1 may have the same voltage as the body electrode. In an embodiment, a voltage difference between the source electrode and the body electrode of the first transistor M1 may be approximately 0 V, for example. According to the changed voltage difference between the body electrode and source electrode of the first transistor M1, the first transistor M1 may have a second threshold voltage different from the first threshold voltage.

During the third period T3, when the voltage of the first driving power VDD is supplied to the first node N1, the voltage of the third node N3 may vary depending on changes in the voltage of the first node N1. In an embodiment, the voltage of the third node N3 may be set as shown in Equation 1.

$$VN3a^{oc} Vdata + (VDD - (Vdata + |Vth(M1)|) \times \frac{C1}{C1 + C2 + C3} \quad \text{[Equation 1]}$$

Referring to Equation 1, VN3a may represent the voltage of the third node N3. As the first driving power VDD is provided to the first node N1 during the third period T3, the voltage of the first node N1 during the third period T3 may be changed from a voltage (Vdata+|Vth(M1)|) obtained by adding the voltage Vdata of the data signal DATA and the absolute threshold voltage (|Vth(M1)|) of the first transistor M1 to the voltage of the first driving power VDD. Therefore, VDD−(Vdata+|Vth(M1)|) may represent a voltage variation of the first node N1.

The voltage of the third node N3 may also be changed by coupling of the first capacitor C1. A voltage variation of the third node N3 may be determined depending on a ratio of the first capacitor C1, the second capacitor C2, and the third capacitor C3. In an embodiment, as shown in Equation 1, the voltage variation of the third node N3 due to the voltage variation of the first node N1 may be a value obtained by multiplying the voltage variation of the first node N1 and C1/(C1+C2+C3), for example. In the case where the voltage variation of the third node N3 is controlled by the ratio of the first capacitor C1, the second capacitor C2, and the third capacitor C3, the voltage range of the data signal may be sufficiently widened. In an embodiment, a voltage range of the data signal may be determined based on the components included in the pixel PXij, for example. In an embodiment of the disclosure, the voltage of the third node N3 may be changed depending on a ratio of the first capacitor C1, the second capacitor C2, and the third capacitor C3, thereby allowing the range of the voltage Vdata of the data signal DATA to be increased. In an embodiment, due to the ratio of the first capacitor C1, the second capacitor C2, and the third capacitor C3, the voltage variation of the third node N3 may be relatively reduced, whereby the voltage of the third node N3 may also be relatively reduced, for example. Consequently, even when the voltage range of the data signal is designed to be relatively wide, the voltage applied to the third node N3 may fall within the desired voltage range. In an embodiment, the data driver 140 may implement 255 grayscale levels using a relatively wide voltage range of approximately 3.29 V, for example. As a result, fine grayscale representation of the pixel PXij in an embodiment of the disclosure is enabled.

The second capacitor C2 may adjust a rate at which the voltage variation of the first node N1 is reflected in the voltage variation of the second node N2. In an embodiment, as the second capacitor C2 increases, the voltage variation of the third node N3 with respect to the voltage variation of the first node N1 may be reduced, for example. In this case, the voltage range of the data signal may be selected to be more suitable for the display device 100.

After voltage of the third node N3 is set as shown in Equation 1, the amount of current supplied to the second node N2 through the first transistor M1 may vary in response to the voltage of the third node N3. Accordingly, the voltage of the anode electrode (e.g., the second node N2) of the first transistor M1 may be changed.

The second node N2 and the third node N3 are connected to each other through the third capacitor C3. The voltage of the third node N3 may be further changed depending on the voltage variation of the second node N2. In an embodiment, the voltage of the third node N3 may be changed by coupling of the third capacitor C3, for example.

$$VN3b^{oc} VN3a + \triangle VN2 \times \frac{C3}{C1 + C2 + C3} \quad \text{[Equation 2]}$$

Referring to Equation 2, ΔVN2 represents the voltage variation of the second node N2, and VN3b represents the voltage of the third node N3 corresponding to the voltage variation (ΔVN2). As shown in Equation 2, the voltage of the third node N3 may be determined by the sum of VN3a from Equation 1 and a value obtained by multiplying the voltage variation (ΔVN2) of the second node N2 by C3/(C1+C2+C3).

In embodiments of the disclosure, the threshold voltage of the first transistor M1 may be secondarily compensated for by reflecting the voltage variation (ΔVN2) of the second node N2 in the voltage of the third node N3 through the third capacitor C3.

The voltage variation (ΔVN2) of the second node N2 may be set in response to a change in the threshold voltage of the first transistor M1. In an embodiment, the voltage variation (ΔVN2) of the second node N2 may be set to different values in response to a change in the threshold voltage of the first transistor M1 from the first threshold voltage to the second threshold voltage, for example. In an embodiment, the voltage variation (ΔVN2) of the second node N2 may reflect the second threshold voltage of the first transistor M1, for example. In response to the voltage variation (ΔVN2) of the second node N2, the voltage of the third node N3 may be further changed so that the first transistor M1 is turned on and/or turned off, thereby compensating for the second threshold voltage of the first transistor M1.

In an embodiment of the disclosure, threshold voltage compensation may be independently performed on the first transistor M1 included in each of the pixels PX of FIG. 2. In an embodiment, each of the pixels PX included in the pixel component 110 of FIG. 2 may include the first transistor, for example. Here, during the driving process of the display device 100, the respective first transistors of the pixels PX may have different threshold voltages. Here, the voltage variations of the first and second nodes N1 and N2 of the pixels PX may also be set to different values in response to the respective threshold voltages of the corresponding first transistors. As the voltage variations of the first and second nodes N1 and N2 are reflected in the third node N3, the threshold voltage of the first transistor included in each of the pixels PX may be compensated for. In an embodiment of the disclosure, the display device 100 may have improved grayscale representation performance.

Figure 10:
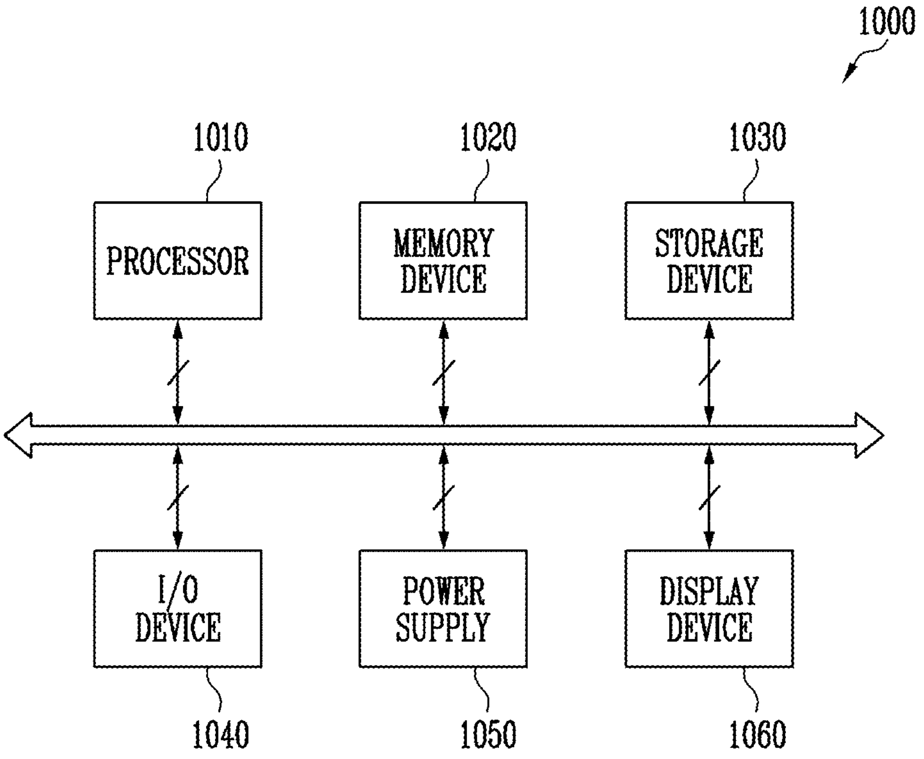
FIG. 10 is a block diagram illustrating an electronic device in accordance with embodiments of the present disclosure.
Figure 11:
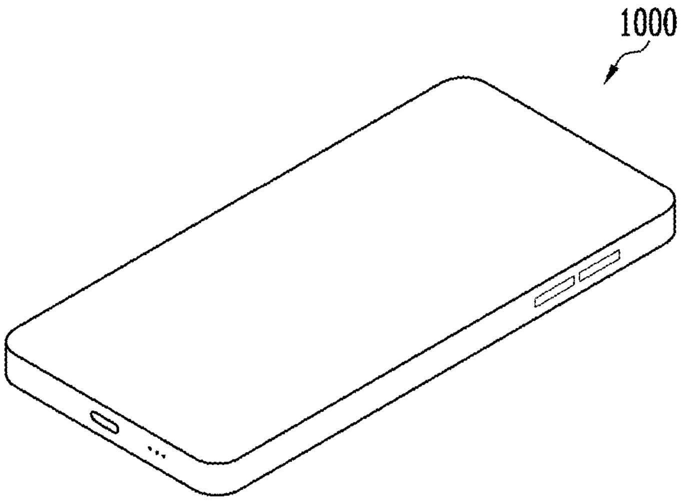
FIG. 11 is a schematic diagram illustrating an example where the electronic device of FIG. 10 is implemented as a smartphone.
Figure 12:
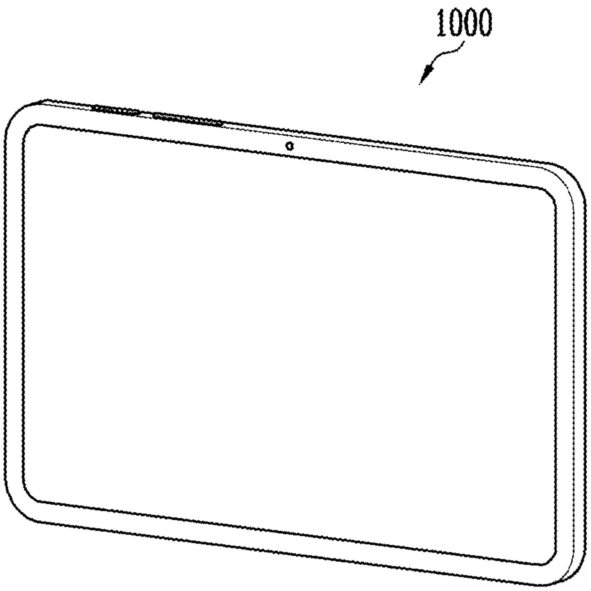
FIG. 12 is a schematic diagram illustrating an example where the electronic device of FIG. 10 is a tablet computer.

FIG. 10 is a block diagram illustrating an electronic device 1000 in accordance with embodiments of the present disclosure. FIG. 11 is a diagram illustrating an example where the electronic device 1000 of FIG. 10 is a smartphone. FIG. 12 is a schematic diagram illustrating an example where the electronic device 1000 of FIG. 10 is a tablet computer.

Referring to FIGS. 10 to 12, the electronic device 1000 may include a processor 1010, a memory device 1020, a storage device 1030, an input/output (I/O) device 1040, a power supply 1050, and a display device 1060. The display device 1060 may be the display device of FIG. 2. The electronic device 1000 may further include various ports for communication with a video card, a sound card, a memory card, a USB device, or other systems. In an embodiment, as illustrated in FIG. 11, the electronic device 1000 may be implemented as a smartphone. In an embodiment, as illustrated in FIG. 12, the electronic device 1000 may be implemented as a table computer. However, the aforementioned examples are illustrative, and the electronic device 1000 is not limited to the aforementioned examples. For example, the electronic device 1000 may be implemented as a cellular phone, a video phone, a smart pad, a smartwatch, a navigation device for vehicles, a computer monitor, a laptop computer, a head-mounted display device, and so on.

The processor 1010 may perform specific calculations or tasks. In an embodiment, the processor 1010 may include at least one of a central processing unit, an application processor, a graphic processing unit, a communication processor, an image signal processor, a controller, or the like. The processor 1010 may be connected to other components through an address bus, a control bus, a data bus, and the like. In an embodiment, the processor 1010 may be connected to an expansion bus such as a peripheral component interconnect (PCI) bus. In an embodiment, the processor 1010 may provide input image data to the display device 1060. Hence, the display device 1060 may display an image based on the input image data provided from the processor 1010.

The memory device 1020 may store data needed to perform the operation of the electronic device 1000. The memory device 1020 may function as a working memory and/or a buffer memory for the processor 1010. For example, the memory device 1020 may include one or more volatile memory devices such as a dynamic random access memory (DRAM) device, a static random access memory (SRAM) device, and a mobile DRAM device.

The storage device 1030 may store data in response to control signals or data from the processor 1010. The storage device 1030 may include one or more non-volatile storages to retain the data even when the electronic device 1000 is powered off. In some embodiments, the storage device 1030 may include a solid state drive (SSD), a hard disk drive (HDD), a CD-ROM, or the like.

The I/O device 1040 may include input devices such as a keyboard, a keypad, a touchpad, a touch screen, and a mouse, and output devices such as a speaker and a printer. In an embodiment, the display device 1060 may be integrated with the I/O device 1040.

The power supply 1050 may supply power needed to perform the operation of the electronic device 1000. For example, the power supply 1050 may include a power management integrated circuit (PMIC). In an embodiment, the power supply 1050 may supply power to the display device 1060.

The display device 1060 may display images in response to image data signals and/or control signals from the processor 1010. The display device 1060 may be connected to other components through the buses or other communication links.

In accordance with a pixel and a display device including the pixel in embodiments of the disclosure, the pixel may be implemented using a transistor (e.g., a MOSFET) suitable for relatively high resolution.

However, effects of the disclosure are not limited to the above-described effects, and various modifications are possible without departing from the spirit and scope of the disclosure.

The scope of the disclosure is not limited by detailed descriptions of the specification, and should be defined by the accompanying claims. Furthermore, all changes or modifications of the disclosure derived from the meanings and scope of the claims, and equivalents thereof should be construed as being included in the scope of the disclosure.

What is claimed is:

1. A pixel comprising:

a first transistor including:

a first electrode connected to a first node;

a second electrode connected to a second node; and a gate electrode connected to a third node;

a second transistor connected between a data line and the third node, the second transistor including:

a gate electrode electrically connected to a first scan line;

a third transistor connected between a first power line to which first driving power is supplied, and the first node, the third transistor including:

a gate electrode electrically connected to an emission control line;

a first capacitor connected between the first node and the third node;

a second capacitor connected between the third node and a reference power line to which reference power is supplied;

a third capacitor connected between the second node and the third node; and a light-emitting element connected between the second node and a second power line to which second driving power is supplied.

2. The pixel according to claim 1, further comprising a fourth transistor including a first electrode connected to the second node, a second electrode electrically connected to a third power line to which initialization power is supplied, and a gate electrode electrically connected to a second scan line.

3. The pixel according to claim 2, wherein a voltage level of the reference power is lower than a voltage level of the first driving power, and is higher than a voltage level of the initialization power.

4. The pixel according to claim 2, wherein a voltage level of the reference power is equal to a voltage level of the first driving power, and wherein the reference power line is the first power line.

5. The pixel according to claim 2, wherein, when a voltage of the initialization power is supplied to the second node, the light-emitting element is turned off.

6. The pixel according to claim 2, wherein each of the first transistor to the fourth transistor comprises a metal-oxide-semiconductor field-effect transistor including a body electrode.

7. The pixel according to claim 6, wherein a voltage of the first driving power is supplied to the body electrode of each of the first transistor to the fourth transistor.

8. The pixel according to claim 2, wherein a horizontal period includes a first period, a second period, and a third period, wherein, during the first period, the second transistor, the third transistor, and the fourth transistor are set to a turn-on state, wherein, during the second period, the second transistor and the fourth transistor are set to the turn-on state, and the third transistor is set to a turn-off state, and wherein, during the third period, the third transistor and the fourth transistor are set to the turn-on state, and the second transistor is set to the turn-off state.

9. The pixel according to claim 8, wherein, during the first period to the third period, a voltage of a data signal is supplied to the data line.

10. The pixel according to claim 1, wherein each of the first capacitor to the third capacitor includes a metal-oxide-metal capacitor or a metal-insulator-metal capacitor.

11. The pixel according to claim 1, wherein each of the first capacitor and the second capacitor includes a metal-oxide-metal capacitor or a metal-insulator-metal capacitor, and wherein the third capacitor includes a parasitic capacitor.

12. A display device comprising:

pixels connected to write scan lines, initialization scan lines, data lines, and emission control lines, the pixels including:

a pixel disposed on an i-th pixel row and a j-th pixel column, i and j respectively being natural numbers greater than zero, the pixel comprising:

a first transistor including a first electrode connected to a first node, a second electrode connected to a second node, and a gate electrode connected to a third node;

a second transistor connected between a j-th data line among the data lines and the third node, and configured to be turned on when a first scan signal is supplied to a first scan line among the write scan lines;

a third transistor connected between a first power line to which a voltage of first driving power is supplied and the first node, and configured to be turned off when an emission control signal is supplied to a k-th emission control line, k being a natural number greater than zero;

a first capacitor connected between the first node and the third node;

a second capacitor connected between the third node and a reference power line to which reference power is supplied;

a third capacitor connected between the second node and the third node; and a light-emitting element connected between the second node and a second power line to which second driving power is supplied.

13. The display device according to claim 12, wherein the pixel disposed on the i-th pixel row and the j-th pixel column further comprises a fourth transistor including a first electrode connected to the second node, and a second electrode electrically connected to a third power line to which initialization power is supplied, the fourth transistor being configured to be turned on when a second scan signal is supplied to a second scan line.

14. The display device according to claim 13, wherein a voltage level of the reference power is lower than a voltage level of the first driving power, and is higher than a voltage level of the initialization power.

15. The display device according to claim 13, wherein a voltage level of the reference power is equal to a voltage level of the first driving power, and wherein the reference power line is the first power line.

16. The display device according to claim 15, wherein each of the first transistor to the fourth transistor includes a metal-oxide-semiconductor field-effect transistor including a body electrode, and the voltage of the first driving power is supplied to the body electrode.

17. An electronic device comprising:

a processor to provide input image data; and a display device to display an image based on the input image data, the display device comprising:

pixels connected to write scan lines, initialization scan lines, data lines, and emission control lines, the pixels including:

a pixel disposed on an i-th pixel row and a j-th pixel column, i and j respectively being natural numbers greater than zero, the pixel comprising:

a first transistor including a first electrode connected to a first node, a second electrode connected to a second node, and a gate electrode connected to a third node;

a second transistor connected between a j-th data line among the data lines and the third node, and configured to be turned on when a first scan signal is supplied to a first scan line among the write scan lines;

a third transistor connected between a first power line to which a voltage of first driving power is supplied and the first node, and configured to be turned off when an emission control signal is supplied to a k-th emission control line, k being a natural number greater than zero;

a first capacitor connected between the first node and the third node;

a second capacitor connected between the third node and a reference power line to which reference power is supplied;

a third capacitor connected between the second node and the third node; and a light-emitting element connected between the second node and a second power line to which second driving power is supplied.

* * * * *